Jan. 8, 1935. C. A. LAEMMEL 1,986,934
FOOD CHOPPER
Filed Feb. 3, 1933 2 Sheets—Sheet 1
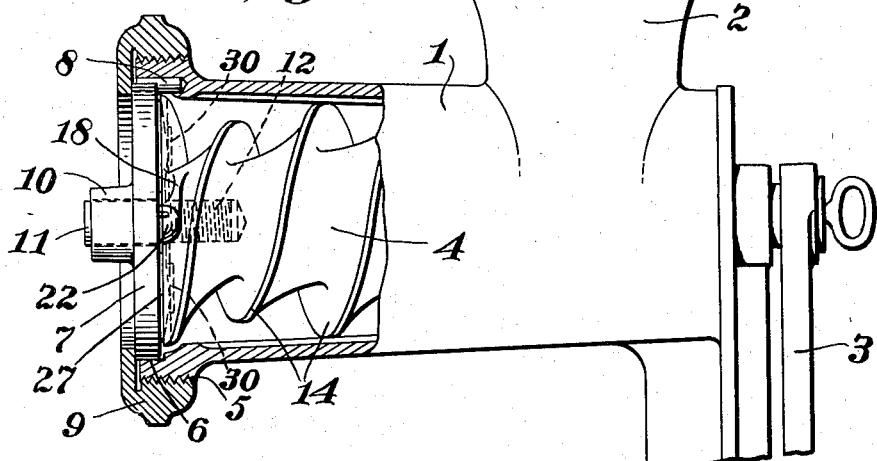
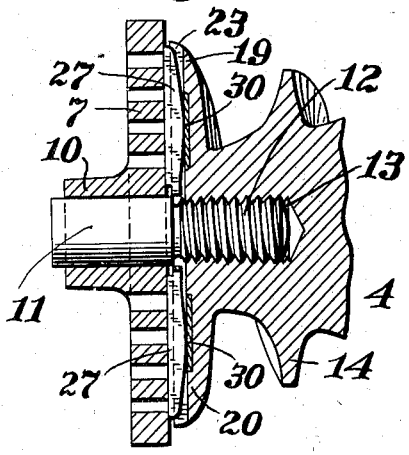
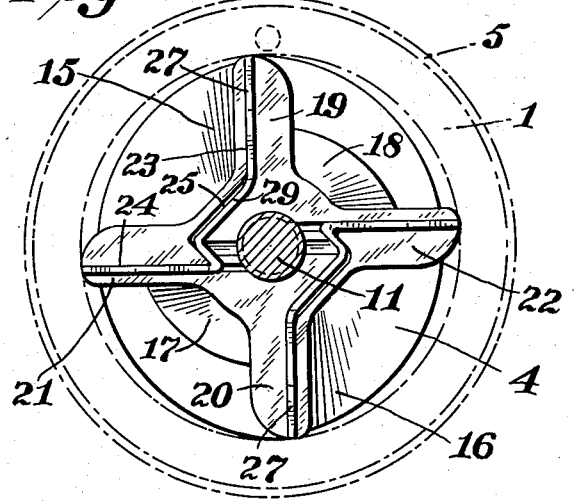
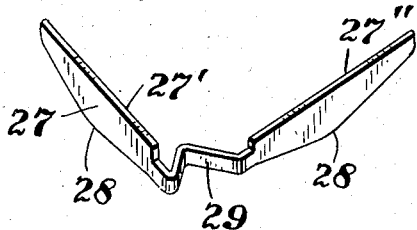
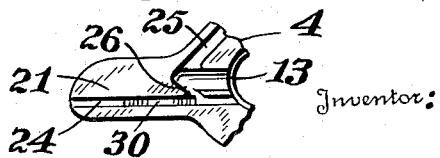
Inventor:
Charles A. Laemmel,
By Parker Cook
Attorney.

Jan. 8, 1935. C. A. LAEMMEL 1,986,934
FOOD CHOPPER
Filed Feb. 3, 1933 2 Sheets-Sheet 2

Inventor:
Charles A. Laemmel,
By Parker Cook
Attorney.

Patented Jan. 8, 1935

1,986,934

UNITED STATES PATENT OFFICE 1,986,934

FOOD CHOPPER

Charles Albert Laemmel, Brooklyn, N. Y., assignor to Atlantic Service Company, Inc., Brooklyn, N. Y., a corporation of New York Application February 3, 1933, Serial No. 655,093

5 Claims. (Cl. 146—189)

My invention relates to new and useful improvements in food choppers, and has for an object to provide a food chopper that is simple in construction and contains a less number of parts than food choppers heretofore made.

Still another object of the invention is to provide a food chopper wherein the worm or screw is formed at its outer end (that is, the end adjacent the usual perforated plate) to act as a carrier or holder for the knives or cutters.

As is well known to those skilled in the art, food choppers generally consist of the barrel or body of the food chopper with the worm or screw, the handle for turning the same, and a carrier or knife which, in turn, is fitted to and actuated by the screw; this carrier or knife bearing against the perforated plate, so that the meat will be cut, and properly forced through the plate.

The present invention contemplates using a worm or screw with a double thread throughout its length and four threads at its end, that is, its one end is formed to receive a multiplicity of knife blades, thus dispensing with the ordinary form of knife or knife carrier.

Still another object of the invention is to provide a food chopper wherein one end of the worm may be formed to simulate the arms of an ordinary carrier, which arms will be slotted to either hold two pairs of knife blades, similar to those shown in an application filed by me on September 3, 1932, Serial No. 631,721, for Knives for food choppers, or they may hold separate blades, as will be more fully described as the specification proceeds.

Still another object of the invention is to form the end of the worm quadruple in form, and so cut the faces of the four resultant arms that they, in turn, act as carriers for the knife blades, thus doing away with the conventional knife or knife carrier, as heretofore used.

Still another object of the invention is to provide a worm, the end of which is provided with radial slots, which, in turn, carry adjustable or self-aligning blades adapted to be quickly removed and replaced, or reground when found necessary.

With these and other objects in view, the invention consists in certain new and novel arrangements and combination of parts, as will be hereinafter more fully described and pointed out in the claims.

Referring now to the drawings showing a preferred form and two modifications,

Fig. 1 is a fragmentary side elevation, with parts broken away and in section for clearness of illustration;

Fig. 2 is a fragmentary enlarged sectional view showing the manner in which the blades are adjustably positioned in the end of the worm or helix;

Fig. 3 is an end view of the worm, with the blades in place, and showing the manner in which they are seated;

Fig. 4 is a fragmentary detail of the end of one arm of the helix and showing a hardened steel wear plate inserted in a counter recess thereof;

Fig. 5 is a perspective view of one of the double knife blades;

Figure 6:
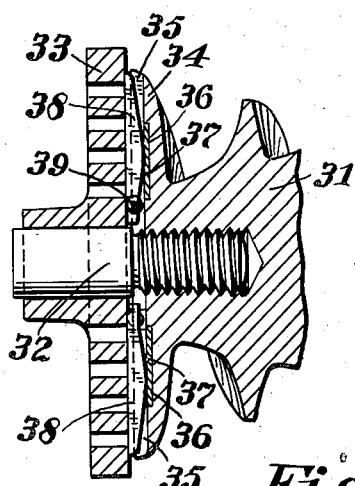
Fig. 6 is a view similar to Fig. 2, showing, however, a slight modification of the blades and the manner in which they are held in the face of the worm.
Figure 7:
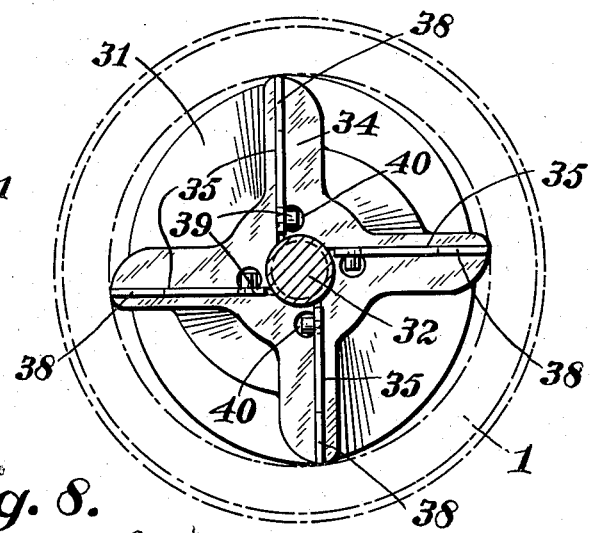
Fig. 7 is an end view thereof, similar to Fig. 3.
Figure 8:
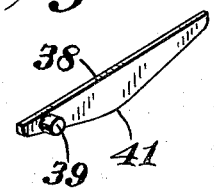
Fig. 8 is a detail perspective of one of the blades.

Referring now more particularly to the several views, and for the moment to Figs. 1 to 5 inclusive, there is shown the conventional form of barrel 1, having the hopper 2 and the handle 3 which, in turn, actuates the worm or helix 4. The outer end of the barrel is externally threaded, as at 5, and recessed, as at 6, to hold the usual perforated plate 7 in place, which may be pinned, as at 8, to prevent rotation thereof. There is also the usual ring 9 to secure the plate in place. The perforated plate 7 is provided with a centrally located hub 10, through which passes the stud 11, which is threaded, as at 12, to, in turn, be threaded within the central opening 13 of the worm or helix 4. As may be readily seen from Fig. 1, the ordinary form of knife or carrier has been dispensed with.

In order that the meat or other material to be ground or chopped will pass speedily to the outer end of the worm, the same is usually formed with a doubled thread, as shown.

As may be seen in Fig. 1, two threads of the worm are of larger diameter and extend right out to the forward or cutting edge of the worm. The other two threads are of smaller diameter. The larger threads or spirals of the worm may be seen at 15 and 16 while the smaller ones may be clearly seen at 17 and 18. It will be understood that the quadruple threads might possibly extend the full length of the worm but preferably the smaller ones 17 and 18 are spaced between the larger ones only at the cutting end and then fade into the body of the worm.

The purpose of having these threads of different diameters is to allow more space for the meat and in no way retard its flow. Of course, it is within the province of the invention to have a triple-threaded worm or simply a double-threaded worm, while the end of each thread in any instance would carry its respective cutting knife.

Referring to Fig. 3, it will be seen that I flatten off the end of the thread 15 to, in reality, form the arm 19, while diametrically opposite, the same procedure is carried out to form the arm 20. In a like manner, the end 17 of the smaller thread is flattened out to form the arm 21 and, in a like manner, diametrically opposite, the thread 18 is flattened to form the arm 22.

As also may be seen in Figs. 2 and 3, the arms 19 and 21 are milled on their face with the respective slots 23 and 24, and are, in turn, joined by the little angular slots 25 and 26, so that the double spring knife blade 27 may be snapped into place. This spring knife blade, and the way it is mounted in a continuous slot, forms the subject matter of a separate application filed by me on September 3, 1932, Serial No. 631,721, for Knives for food choppers.

It will be understood in that former application, however, the self-aligning knives were mounted in a carrier of more or less conventional type rather than in the end of the worm, as shown in the present application.

Just briefly described, therefore, the double knife consists of the two arms 27' and 27", which are angularly shaped on their bottom, that is, taper from their respective ends toward the centers, as at 28, so that these blades may properly seat and rock themselves within the respective slots 23 and 24. In other words, they will always extend at exactly right angles to the perforated plate 7 and contact with the plate throughout their entire cutting edges. The integral bridge portion 29 allows the blades to be sprung slightly so that when being inserted they can be quickly and readily snapped into place. Also, this bridge portion being reduced allows each blade to properly set itself with respect to the plate 7.

Inasmuch, however, as the worm 4 is generally formed of iron, cast or otherwise, there might be a tendency for the raised portions 28 on the under sides of the blades to wear the bottom of their respective slots in the end of the worm, so, as may be noticed in Figs. 1, 2 and 4, I preferably counter-recess the respective slots and insert the little hardened plates 30. Thus, the knives, at these high points on their bottom surfaces will rest or bear upon the hardened steel plates and prevent any wearing in the bottoms of the slots of the worm 4.

It will also be understood that if desired, I might harden the end of the worm, so that the side walls of the respective slots for the blades will be insured against any undue wear.

It will be seen, therefore, that when these double spring knife blades are inserted in their respective slots in the end of the worm, they will properly align themselves with respect to the plate 7 and extend at a 90° angle to the front surface thereof and thus sharply cut the meat rather than tear or shred the same.

The stud 11 of the stub shaft will axially align the worm or helix, and as the knives are fitted right within the end of this worm or helix, the position of the knife blades will always be correct.

From the above construction, it will be seen that the cutting edges of the blades must always align in the most efficient fixed position with the termination of the worm, that is, directly in back of the point where the meat is under most pressure.

It will also be understood that the end of the worm might be triplicate in form rather than quadruple and in that case there would be only three arms instead of four for holding the knife blades.

Referring now to the first modification shown in Fig. 6, it will be seen that the worm 31 (with the end quadruple in form) is exactly the same, as is likewise the shaft 32 and plate 33, to the preferred form, but in this instance, in the arms 34 formed at the end of the threads of the worm, instead of forming two pairs of connecting slots, I mill four separate slots 35, counter-recess these, as at 36, (see Fig. 6) and insert the small steel plates 37. Then I insert four separate knife blades 38 which, at their one end, have the little steel studs 39 which, in turn, fit within the small bores 40 that are adjacent the rear end and at one side of each of the slots 35.

The knife blades are angular-shaped on their under surface and extend to the apex 41, so that these knives may rock or properly seat themselves after being placed in the slot and pulled up against the plate 33.

By providing these little studs 39 in the small counter-bores 40, the knives are prevented from moving longitudinally of their receptive slots.

Figure 9:
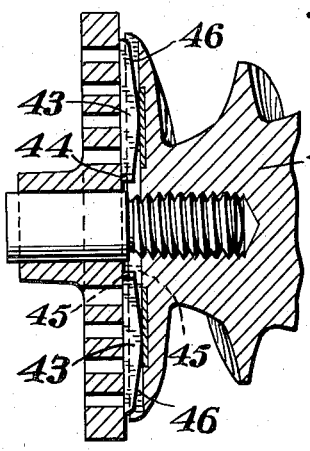
Fig. 9 is a sectional view, also similar to Fig. 2, and showing a further modification of the knife blade and the manner in which it is carried.
Figure 10:
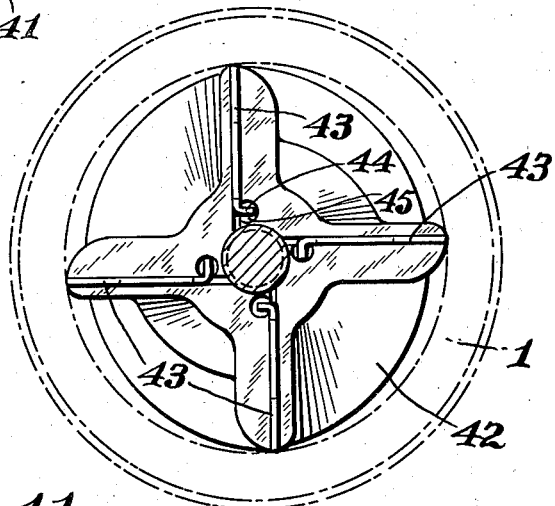
Fig. 10 is an end view thereof, and showing all of the knives in position.
Figure 11:
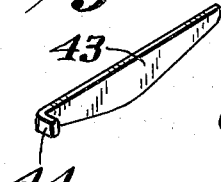
Fig. 11 is a perspective of one of these last-mentioned knives.

Figs. 9 to 11 show a still further slight modification, the worm 42 being exactly the same, but in this instance the small knives 43, instead of being provided with a stud, have a turned end 44 which fits within the counter-bores 45 formed near the end of the slots 46 in the end of the worm, as will be readily understood.

Thus, it will be seen that whether the double knife blades, as shown in Fig. 3, are used, or the single knife blades, as shown in the two modifications, are used, they will always properly align themselves with respect to the plate when the plate is pulled up tightly against the worm and thus at all times present the desired cutting edges to the plate and to the meat to be cut.

Another advantage that will be readily seen is that the worm is at all times properly aligned with regard to the plate and, therefore, the blades likewise will be in proper alignment, which is not always the case where a carrier of the conventional type has to be screwed up against the forward end of the worm.

Again, the worm being constructed in this manner causes the self-aligning blades to transmit the pressure against them in a line at 90° to the plate.

From the foregoing, it will be seen that I have provided a food chopper wherein the end of the worm is formed as might be said in quadruple, instead of single or double, so that the end may be formed in the shape of integral arms which, in turn, act as carriers for the self-aligning blades which may be four separate blades or two pairs.

The blades are always in proper alignment, due to the proper alignment of the worm, while the meat is not diverted by any square-studded carrier, which heretofore has been the practice.

Finally, there are less parts to be manufactured and less parts to be cleaned.

Many slight changes might be made as, for instance, upwardly rounding the bottom of the respective slots for the knives and forming the knives straight across their bottom which, of course, is simply a transition of parts. Also, other changes might be made without departing from the spirit and scope of the invention.

What I claim as new and desire to secure by Letters Patent is:

1. A worm for food choppers having a multiplicity of threads of different diameters, the threads at the one end extending in a plane surface at right angles to the longitudinal axis of the worm and provided with receptive radial slots for knife blades, and said slots being counter-recessed and provided with steel inserts.

2. A knife blade for a food chopper being relatively thin and having a plane cutting edge and an arcuate under surface adapted to bear on a flat surface to thus permit the knife blade to rockably adjust itself, and retaining means at its one end extending at an angle to the body of the blade.

3. A worm for a food chopper having a quadruplet thread, the end of each thread forming an arm to act as a knife carrier, the knife carriers divided into pairs and each pair having an irregularly-shaped slot extending from its one arm toward the hub and throughout the length of its other arm, and an irregularly-shaped knife blade fitted within the slot of each pair of carriers and held in position by the irregularly-shaped slot in the carrier.

4. A food chopper including removable knife blades, said knife blades having a plane cutting edge and tapering under surfaces and adapted to rest on plane surfaces to permit rockable adjustment, said knives having retaining means at their one end and in a plane above the base of the taper, and said means extending at an angle to the longitudinal axis of the blades.

5. A knife blade for food choppers formed of relatively thin metal, the blade being flat across its top surface and tapering toward its longitudinal center on its under surface adapted to contact with a plane surface to permit a rockable adjustment at all times, additional metal at the one end of the knife and extending at right angles to the longitudinal axis of the knife to act as a retaining means when the blade is in a food chopper.

CHARLES ALBERT LAEMMEL.